United States Patent [19]
Degenhardt

[11] Patent Number: 6,018,670
[45] Date of Patent: Jan. 25, 2000

[54] MOBILE TELEPHONE SET AND MOBILE TELEPHONE SYSTEM

[75] Inventor: Achim Degenhardt, Germering, Germany

[73] Assignee: Siemens Aktiengesellschaft, Munich, Germany

[21] Appl. No.: 08/782,095

[22] Filed: Jan. 13, 1997

[30] Foreign Application Priority Data

Jan. 12, 1996 [DE] Germany ............... 196 00 965

[51] Int. Cl.$^7$ .................................. H04B 1/38
[52] U.S. Cl. ........................... 455/561; 455/462
[58] Field of Search ................... 455/550, 561, 455/569, 570, 575, 90, 95, 426, 462

[56] References Cited

U.S. PATENT DOCUMENTS

| | | | |
|---|---|---|---|
| 4,741,018 | 4/1988 | Portratz et al. | 455/569 |
| 5,224,151 | 6/1993 | Bowen et al. | 455/569 |
| 5,297,203 | 3/1994 | Rose et al. | 455/462 |
| 5,490,183 | 2/1996 | Nishimura et al. | 455/561 |
| 5,526,405 | 6/1996 | Toda | 455/569 |
| 5,528,666 | 6/1996 | Weigand et al. | 455/570 |
| 5,553,137 | 9/1996 | Nyhart et al. | 455/570 |
| 5,588,041 | 12/1996 | Meyer, Jr. et al. | 455/569 |
| 5,592,536 | 1/1997 | Parkerson et al. | 455/462 |
| 5,636,323 | 6/1997 | Umemoto et al. | 455/569 |
| 5,748,707 | 5/1998 | Sanserino | 455/570 |

FOREIGN PATENT DOCUMENTS

| | | |
|---|---|---|
| 41 07 728 A1 | 9/1992 | Germany . |
| 43 05 256 A1 | 8/1994 | Germany . |
| 91/11873 | 8/1991 | WIPO . |

OTHER PUBLICATIONS

"SPS51—A universal Interface for hands–free Telephony, Speech Recognition and Speech Storage in the Car Telephone" (Schlegel) Philips Telecommunication Review, vol. 48, No. 4, Dec. 1990.

"Wireless telephone equipment", Funkschau, Oct. 1995.

*Primary Examiner*—Reinhard J. Eisenzopf
*Assistant Examiner*—Marsha D. Banks-Harold
*Attorney, Agent, or Firm*—Herbert L. Lerner; Laurence A. Greenberg

[57] ABSTRACT

A telephone system includes a mobile telephone set having a signal processing unit which is coupled through an amplifier unit to a microphone and at least one speaker. The telephone system also includes a stationary base station for communicating with the mobile telephone set. The signal processing unit has a digital signal processor with an associated memory. A hands-free function is accomplished through the use of the additional signal processor. An echo suppressor or echo compensation function realized by the digital signal processor can be reduced or turned off.

7 Claims, 1 Drawing Sheet

MOBILE TELEPHONE SET AND MOBILE TELEPHONE SYSTEM

BACKGROUND OF THE INVENTION

Field of the Invention

The invention relates to a mobile telephone set and a mobile telephone system.

Mobile telephone sets, especially cordless telephones under the DECT (Digital European Cordless Telecommunication) Standard, have already been on the market for several years. Such telephones are equipped with the most varied functions. For instance, cordless telephones are known that have a base station which has both a normal telephone unit and an additional mobile unit. Only the base station with the telephone unit integrated into it can be used for a hand-free function. For cost reasons, a hands-free function has not yet been implemented in mobile cordless telephones under the DECT Standard.

SUMMARY OF THE INVENTION

It is accordingly an object of the invention to provide a mobile telephone set and a mobile telephone system, which overcome the hereinafore-mentioned disadvantages of the heretofore-known devices of this general type and in which the mobile telephone set, especially a cordless telephone, is equipped under the DECT Standard with a hands-free function.

With the foregoing and other objects in view there is provided, in accordance with the invention, a mobile telephone set for communicating with a stationary base station, the mobile telephone set comprising a microphone; at least one speaker; an amplifier unit for operation of a hands-free function; and a signal processing unit coupled through the amplifier unit to the microphone and the at least one speaker, the signal processing unit having a digital signal processor with an associated memory, and the digital signal processor providing hands-free function.

With the objects of the invention in view there is also provided a telephone system, comprising a mobile telephone set having a microphone, at least one speaker, an amplifier unit for operation of a hands-free function, and a signal processing unit coupled through the amplifier unit to the microphone and the at least one speaker; and a stationary base station for communicating with the mobile telephone set, the stationary base station having a digital signal processor with an associated memory, and the digital signal processor providing hands-free function for the mobile telephone set.

The advantage of the present invention is that the digital signal processor which is already present in a mobile telephone set is used to enable a hands-free function. In most cases, this does not require accommodating any additional hardware in the telephone.

If the memory capacity of the signal processor provided in the mobile portion is insufficient to achieve a hands-free unit, then according to a second embodiment the digital signal processor in the stationary unit can also be used to achieve this function.

Another advantage is that in the latter example mentioned above, a plurality of mobile telephone sets that can be coupled to the base station can be provided with a hands-free function in a simple way.

In accordance with a concomitant feature of the invention, since the hands-free function is advantageously carried out by the weighing method, previous functions, such as the echo suppression function or the echo compensation function of the digital signal processor, can be greatly reduced or turned off during the hands-free conversation, so that adequate computation capacity for the hands-free function is available.

Other features which are considered as characteristic for the invention are set forth in the appended claims.

Although the invention is illustrated and described herein as embodied in a mobile telephone set and a mobile telephone system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
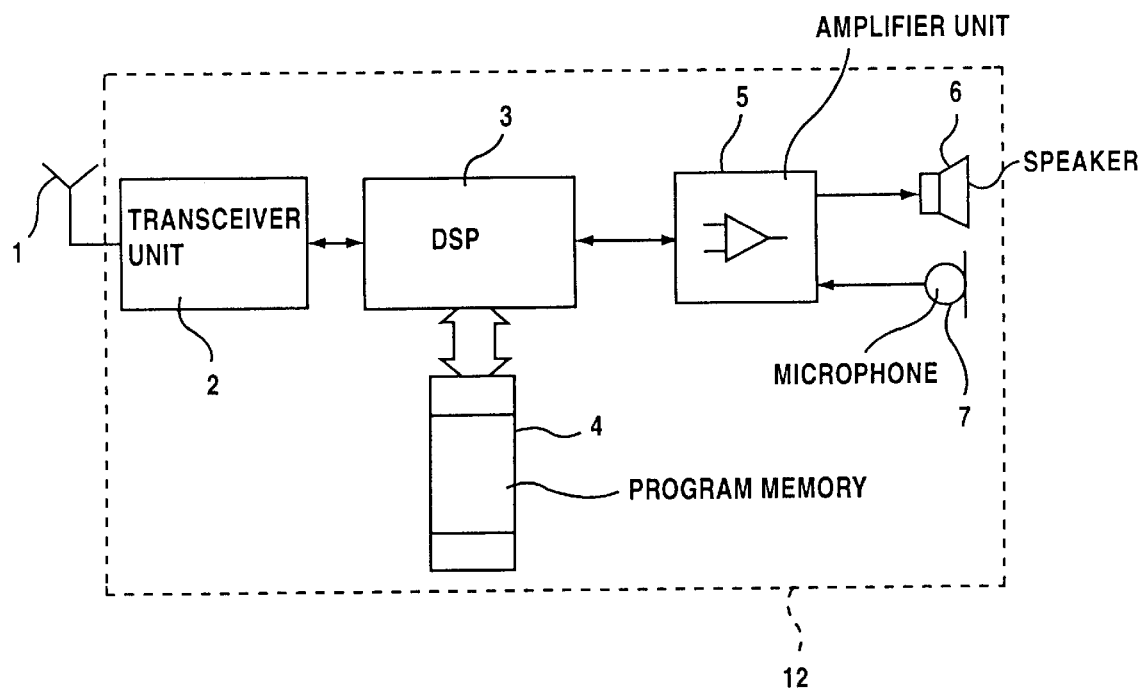
FIG. 1 is a schematic and block circuit diagram of a mobile telephone set.

Referring now to the figures of the drawings in detail and first, particularly, to FIG. 1 thereof, there is seen a schematic and block circuit diagram in which reference numeral 1 indicates a transmission and reception antenna that is connected to a transceiver unit 2. Signals received and to be sent by this unit 2 are transmitted through a connection to a digital signal processor 3. Among other elements, a program memory 4 which contains various programs for various functions, is coupled to the signal processor. The digital signal processor 3 is also coupled to an amplifier unit 5, which contains a digital/analog converter, analog/digital converter, and associated amplifiers. Analog output signals are then transmitted to a speaker 6, and analog input signals are transmitted through a microphone 7. The entire unit forms a mobile portion or mobile telephone set 12.

Figure 2:
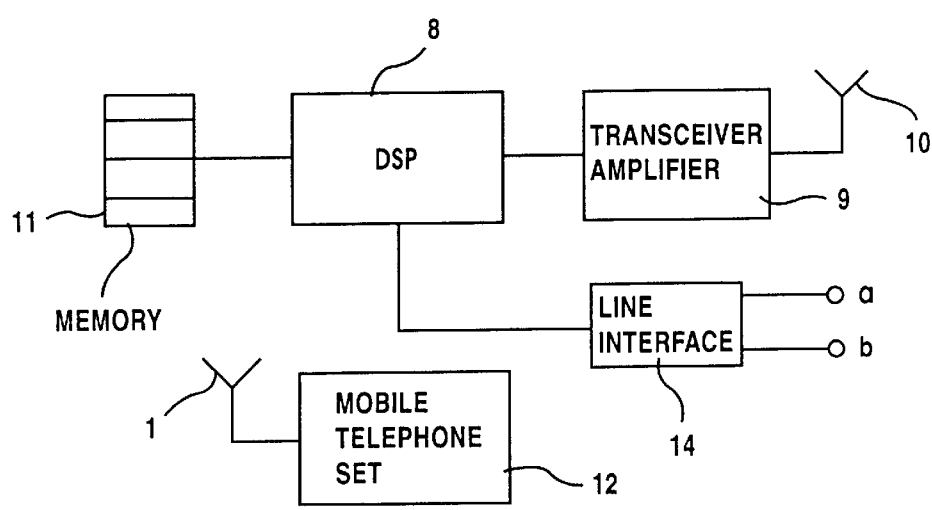
FIG. 2 is a schematic and block circuit diagram of a telephone system with a mobile telephone set.

FIG. 2 symbolically represents a stationary station in simplified form as a digital signal processor 8, a transceiver amplifier 9 coupled thereto and an antenna 10 coupled to the amplifier. Reference numeral 14 indicates a line interface, which is coupled on one hand to the signal processor 8 and on the other hand to a two-wire line a, b. The mobile telephone set is identified by reference numeral 12, and the antenna 1 is integrated therein.

Typically, a so-called open or direct listening function is additionally integrated in a hands-free function. That would necessitate a second speaker. In the opening listening mode, the reception signal would then be additionally output from a separate speaker. However, such a function in addition to the hands-free function would make no sense in a mobile telephone set, if this function is integrated with the speaker located directly at the ear. Moreover, for space reasons, it is not absolutely practicable to integrate a second speaker in the mobile portion. Nevertheless, it would be conceivable to accommodate a second speaker in a suitable mobile portion.

In order to enable hands-free conversion through a mobile telephone set, the analog interface in the mobile telephone set must be capable of operating a sufficiently high-power speaker. The microphone gain must be increased as compared with the normal mode. The speaker and microphone that are already present in the mobile telephone set are used for the hands-free mode. The amplifier unit 5 must be constructed accordingly to meet the demands of the hands-free mode. In the hands-free mode, the telephone is then placed on a table, for instance.

The actual hands-free algorithm is implemented entirely in the memory 4 of the mobile unit or in a memory 11 of the stationary unit. As a rule, in every DECT telephone, this signal processor is contained both in the base station and in every mobile portion. Therefore, hands-free operation can be accomplished in either the mobile station or the base station.

In the block circuit diagram shown in FIG. 1, the hands-free operation is accomplished in the mobile portion. To that end, the signal processor 3 located in the mobile portion would have to additionally process a hands-free algorithm in its program memory 4. A non-illustrated RAM required for the hands-free mode as well as the requisite computation capacity would therefore have to be furnished in the mobile portion 12. If the computation capacity of the signal processor contained therein is great enough and if enough memory space is available in the program memory and in RAM then, according to the invention, the hands-free function can be accomplished through the use of this signal processor 3.

However, if that is not the case, then it is advantageous to provide the hands-free mode according to the invention through the use of the signal processor 8 of FIG. 2 which is present in the base station. Another advantage over the first version is that by this provision, there is no increased power consumption in the mobile portion. Moreover, a DECT base station can handle up to 12 channels. The number of mobile portions is thus a multiple of the number of base stations. It is therefore especially appropriate to implement the hands-free mode according to the invention in the base station. A maximum of one hands-free algorithm needs to be provided for this purpose for each external mobile portion 12.

Accomplishing the hands-free mode is effected in accordance with an algorithm based on the weighing method. As a rule, this method requires neither additional computation power nor more RAM in the base station, since according to the DECT Standard, one echo suppressor for each external terminal and in the case of analog terminals an echo compensator as well, must be furnished. As will be demonstrated below, the echo suppressor may also be turned off in the hands-free mode. The requisite computation power for the echo compensator can likewise be reduced in the hands-free mode. Optionally, the echo compensator can even be turned off as well. The thus-liberated computation capacity and the liberated data memory can then be used for the hands-free function. As a rule, the hands-free mode therefore requires neither more computation capacity nor more RAM. Only the program memory 11 needs to be removed for the hands-free algorithm. The hands-free mode can therefore be offered at very little additional cost.

In a telephone according to the DECT Standard, the signal transmit time between the microphone 7 and the line interface 14 is more than 10 ms. The same is true for the reception direction. In other words, the signal transit time between the line interface 14 and the speaker 6 in the mobile portion is also more than 10 ms. The reason for this is the time-division multiplexing process that is employed for the radio transmission between the base station and the mobile station. The line interface 14 as a rule is not ideal. In other words, the outgoing signal is coupled into the reception channel in damped form, by the amount of what is known as transhybrid loss. The signal fed back in the line interface 14 is perceived as an echo. The speech signals that are picked up in the microphone 7 of the mobile portion 12 reach the speaker 6 again with an approximately 20 ms delay. In practice it has been found that a side-tone of about 20 ms is perceived as very annoying. According to the DECT Standard, the base station must therefore compensate for the echo of the line interface 14.

The DECT Standard provides for an echo suppressor in order to also damp the echoes that arise within the telephone network. This echo suppressor always damps the received signal whenever there is speech in the outgoing direction. Echoes with a transit time of up to 70 ms can be damped through the use of the echo suppressor.

The DECT Standard prescribes that the outgoing signal may be returned damped by 33 dB at minimum. In other words, the echo damping, measured between the microphone 7 and the speaker 6 of the mobile portion 12, must be greater than 33 dB. Since the echo suppressor likewise damps the echo, the echo damping accomplished by the echo compensator can be corresponding less. The allowable damping for the echo suppressor is between 9 and 12 dB. The echo compensator must therefore assure an echo damping of at least 21 to 24 dB. This value must be corrected by the transhybrid loss of the line interface (typically 6 to 18 dB) and the gain and damping settings present in the system (microphone gain, speaker gain, transmission and reception gain of the line interface, amplifications and dampings within the signal processing).

Depending on country regulations and the type of line interface 14, the echo compensator must perform an additional echo damping of 20 to 30 dB. The far-end echoes that occur in the telephone system are damped only by the echo suppressor by 9 to 12 dB.

A hands-free system according to the invention that operates by the weighing method inserts a defined damping in either the outgoing direction or the receiving direction. Often there is also a so-called idle state, in which half the damping is inserted in each direction. In general it is true that the sum of dampings being inserted ("rise") is constant. The inserted damping on one hand should assure the stability of the overall system and on the other hand should damp the acoustical echo that arises from the speaker and microphone coupling. The goal of the damping of the acoustical echo is for the far-end party not to be able to perceive the acoustical echo. Typically, the sum of the dampings ("rise") is about 40 dB.

The damping members in the hands-free mode damp not only the acoustical echo but also the side-tone, that is the echo which arises from the line interface 14. The function of the echo suppressor is therefore no longer needed in the case of a hands-free mode. The echo suppressor would in fact worsen the hands-free mode, since the damping of the echo compensator may possibly be active if the reception channel is open. The echo suppressor should therefore be off when the hands-free mode is on.

The echo compensator, which compensates for the echo of the line interface, will reinforce the hands-free mode, since the echo compensator largely removes the outgoing signal from the received signal. If the direction of transmission is open, then it is easier to decide which of two parties is speaking.

Due to the relatively high damping of the hands-free mode, the echo compensator need not achieve the same echo damping as in a mode without hands-free operation, in order to still meet the DECT demands. The hands-free operation itself does not absolutely require an echo compensator that virtually completely suppresses the line echo, either. In other words, in the case of hands-free operation, the demands of the echo compensator can be reduced. Optionally, the echo compensator can even be turned off completely. Excellent hands-free operation can be made possible even without the use of the echo compensator.

Two echo compensators which are constructed as FIR filters are frequently used in order to be able to suppress the line echo as much as possible even during so-called "double talk", that is if both parties speak at once. One of the two echo compensators constantly attempts to simulate the line interface. However, that echo compensator operates in the background or in other words does not influence the signal of the transmission and reception path. The subtraction of the echo is accomplished solely by the second echo compensator. However, this second echo compensator is not adaptive. The coefficients are copied whenever the background echo compensator has found a good adaptation to the line interface. If the adaptation of the background compensator is poor, for instance because of double talk, then the coefficients are not copied. High echo damping can be attained with an echo compensator that operates according to this method. However, in the case of hands-free operation such high echo damping is not needed. The nonadaptive echo compensator could be turned off, for instance, and the adaptive echo compensator put in the foreground. Naturally, this reduced echo compensator cannot attain the same good echo damping during double talk, but that is not necessary anyway, since the damping of the weighing method supplies the damping that was missing. Due to the reduction in complexity of the echo compensator, less RAM and computation capacity is needed for the echo compensation.

According to the invention, hands-free operation is accordingly achieved by implementing the weighing method and by turning off the echo suppressor and reducing or even turning off the echo compensator. The thus-gained resources in terms of computation capacity and data memory can be utilized for the hands-free operation. The additional data memory required for the hands-free mode and the additional computation capacity are therefore minimal. The demands of the DECT Standard still continue to be used, since the hands-free operation damps the echo, arising from the line interface, by the established rise. It is precisely in DECT sets with very good echo compensation, that the hands-free function by the weighing method can be offered at no additional expense, since the expense for echo compensation can be reduced.

Hands-free operation implemented in the base station must take into account the fact that the acoustical echo system is conditionally delayed by an additional 20 msec. If the hands-free algorithm includes a comparator, for instance, which compares the energy of the transmitted and received signal with one another in order to enable so-called crosstalk, or which is intended to prevent a so-called self-switchover of the hands-free mode, then the comparator takes the additional transmit time into account. If enough data memory is available, the received signal, that is the signal from the line interface, can be supplied with a delay of up to 20 msec to the comparator that controls the acoustical side. Due to the delay preceding the comparator, the comparator only needs to take into account the acoustics between the speaker and the microphone in the mobile portion. As a result, the two-way performance in the hands-free mode is no poorer than in conventional telephones. Up to 160 RAM memory cells are needed for a delay of 20 msec. If less data memory is available, then at least some of the delay can still be accomplished.

In DECT sets that are connected to an ISDN network, no echo compensator is required. In ISDN telephones, the hands-free algorithm can therefore use only the resources of the echo suppressor. This makes for correspondingly smaller savings in terms of computation capacity and data memory.

If a hands-free algorithm that does not operate by the weighing method is implemented, and instead the acoustical echo that arises by the coupling between the speaker and microphone in the mobile portion is compensated for with the aid of an echo compensator, then the echo compensator for the line interface and the echo suppressor also continue to be needed. The reason for this is that the echo which arises from the line interface is unaffected by the acoustical echo compensator.

I claim:

1. A telephone system, comprising:
   a mobile telephone set having a microphone, at least one speaker, an amplifier unit for operation of a hands-free function, and a signal processing unit coupled through said amplifier unit to said microphone and said at least one speaker; and
   a stationary base station for communicating with said mobile telephone set, said stationary base station having a digital signal processor with an associated memory, and said digital signal processor providing hands-free function for said mobile telephone set.

2. The mobile telephone system according to claim 1, including an additional speaker for the hands-free function.

3. The mobile telephone system according to claim 1, wherein the hands-free function is accomplished by the weighing method.

4. The mobile telephone system according to claim 3, wherein an existing echo suppressor function of said digital signal process is reduced in the hands-free function.

5. The mobile telephone system according to claim 3, wherein an existing echo suppressor function of said digital signal process is turned off in the hands-free function.

6. The mobile telephone system according to claim 1, wherein said digital signal processor reduces an echo compensation function in the hands-free mode.

7. The mobile telephone system according to claim 1, wherein said digital signal processor implements an echo compensator and/or an echo suppressor providing a hands-free algorithm.

* * * * *